(12) United States Patent
Schwartz et al.

(10) Patent No.: US 12,106,520 B1
(45) Date of Patent: Oct. 1, 2024

(54) METHOD TO PERFORM INTRINSIC HYPER-SPECTRAL IMAGING

(71) Applicant: Center for Quantitative Cytometry, San Juan, PR (US)

(72) Inventors: Abraham Schwartz, San Juan, PR (US); Philip Sherman, Cleveland, OH (US)

(73) Assignee: Center for Quantitative Cytometry, San Juan, PR (US)

( * ) Notice: Subject to any disclaimer, the term of this patent is extended or adjusted under 35 U.S.C. 154(b) by 0 days.

(21) Appl. No.: 18/424,779

(22) Filed: Jan. 27, 2024

(51) Int. Cl.
*G06T 7/80* (2017.01)
*G01J 3/28* (2006.01)

(52) U.S. Cl.
CPC .............. *G06T 7/80* (2017.01); *G01J 3/2823* (2013.01); *G01J 2003/2826* (2013.01); *G01J 2003/2879* (2013.01); *G06T 2207/10032* (2013.01); *G06T 2207/20224* (2013.01)

(58) Field of Classification Search
CPC ............. G06T 7/80; G06T 2207/10032; G06T 2207/20224; G01J 3/2823; G01J 2003/2826; G01J 2003/2879
See application file for complete search history.

(56) References Cited

U.S. PATENT DOCUMENTS

| | | | |
|---|---|---|---|
| 8,559,714 B2 * | 10/2013 | Smith | G06T 7/90 382/167 |
| 8,644,911 B1 * | 2/2014 | Panasyuk | G01J 3/28 600/476 |
| 9,435,687 B1 * | 9/2016 | Schwartz | G01J 3/0297 |
| 9,998,636 B2 * | 6/2018 | Schwartz | H04N 25/60 |
| 10,652,484 B1 * | 5/2020 | Schwartz | G01J 3/0264 |
| 10,969,523 B1 * | 4/2021 | Schwartz | G02B 5/0278 |
| 11,151,736 B1 * | 10/2021 | Schwartz | G01J 3/0297 |
| 2014/0085629 A1 * | 3/2014 | Bodkin | G01J 3/2823 356/300 |
| 2024/0094396 A1 * | 3/2024 | Ophir | G01S 7/486 |

* cited by examiner

*Primary Examiner* — Mohamed A. Wasel
(74) *Attorney, Agent, or Firm* — Patenting Consulting Group; Roberto J Rios

(57) ABSTRACT

A method to obtain and process data to generate intrinsic hyper-spectral data cubes is provided, where a data acquisition procedure involves scanning the field of view under focused and diffused conditions and an intrinsic calibration procedure requires focused and diffused scans of the field of view of a white reference surface. The spectra of the diffuse scan of the white reference surface is subtracted from the spectra of the focused scan of the white reference surface resulting in a residual data cube of a scan of the white surface. To obtain an intrinsic data cube of a field of view of interest, the residual data cube is added to the diffused data cube of the field of view of interest generating a resulting data cube that is subtracted from the focused data cube field of view of interest.

29 Claims, 9 Drawing Sheets

Non-fluorescent        Fluorescent

METHOD TO PERFORM INTRINSIC HYPER-SPECTRAL IMAGING

BACKGROUND OF THE INVENTION

One of the main differences between spectra and images is the dimensionality associated to them. Electromagnetic spectra can be considered one-dimensional described by intensities across a range of wavelengths or frequencies while Digital Bayer images consist of two-dimensional arrays consisting of red, green, and blue pixels of spectral intensity that give rise to a field of view. Hyper-spectral images are represented by three-dimensional data cubes of a spatial two-dimensional Bayer array of the field of view and the spectrum of the material associated in each pixel of the spatial image array arranged on a third dimension.

Intrinsic methodology was first developed and demonstrated using one dimensional spectra as described in U.S. Pat. No. 9,435,687 B1, incorporated herein by reference in its entirety. The methodology described in the patent required instrument calibration that produced a Zero Order Spectrum (defined as having the spectral intensity equal to zero across the whole illumination range). This was accomplished by obtaining spectra from the empty reference and sample chambers. The reference spectrum was then subtracted, wavelength by wavelength, from the sample spectrum. The result was referred to as the Residual spectrum which was then added to the reference spectrum, and this resulting sum was then subtracted from the sample spectrum. This simple procedure results in a Zero Order spectrum where all intensity values across the illumination spectrum is equal to zero. Note that the noise spectrum characteristic of the specific instrument is also a component of the Residual spectrum.

Now, if a second set of sample and reference spectra are obtained using the same instrument settings, and the original Residual spectrum is added to the second reference spectrum and this resulting sum is subtracted from the second sample spectrum, the resulting spectrum will not be a Zero Order spectrum, but rather, the noise spectrum for this second set of data.

Thus, further spectral sets obtained using the original Residual spectrum result in the noise spectrum of the instrument at the time of data acquisition.

This follows the classic definition of noise as being constantly random. When spectra were obtained under calibrated conditions of the instrument and a material was placed in the sample chamber, the only source of spectral components had to be derived from the material and the spectra represent the intrinsic characteristics of the sample material.

When Intrinsic methodology was applied to imaging with a two-dimensional spatial array of spectral intensities, the same general principles were followed by subtracting the reference data from the spatial image data. In the case of one-dimensional spectroscopy, the illumination energy from the instrument was the primary component being removed from both the sample and the reference spectra.

Intrinsic imaging requires the removal of the illumination from the field of view and two methods were developed to accomplish this removal of the illumination. One method was to defocus the image such that no spatial detail of the field of view remained in the image. This unfocused image represents the spectral component of the illumination, similar to the reference spectra in spectroscopy. This was demonstrated in U.S. Pat. No. 9,998,636 B2, incorporated herein by reference in its entirety, where the defocused image was subtracted, pixel by pixel, from the focused image of the same field of view, to yield a semi-intrinsic image, in essence, the Residual image. The classic intrinsic image was obtained by adding the Residual image to the unfocused image and then subtracting that resulting sum from the focused image.

The camera calibration was accomplished by taking a focused and defocused set of images of a blank field of view and adding the Residual image to the unfocused image and subtracting that resulting sum from the focused image, as demonstrated in U.S. Pat. No. 10,652,484 B1, incorporated herein by reference in its entirety. However, this methodology is limited by the ability of the instrument to defocus enough to remove all spatial detail in the defocused image. This limitation was addressed in U.S. Pat. No. 10,969,523 B1, incorporated herein by reference in its entirety, by using an illumination defusing material to eliminate all spatial detail from the field of view to produce the diffused image of the field of view. This diffused image is an image of the illumination which is the component that is eliminated from the focused image to produce an intrinsic image. In both the defocused and diffused classic methodologies, the calibration of the camera is validated by producing a Zero Order Image where every pixel is black when the field of view is blank.

Intrinsic technology is a powerful methodology that can reveal features in spectra and images that are normally hidden. This is accomplished by eliminating spectral components that are not intrinsic to the essence of the material of interest. The major irrelevant component within spectra and images is the illumination. Ironically, some portion of the illumination energy must be absorbed by the materials of interest in order to produce a spectrum or image. Any illumination energy that is not absorbed is considered irrelevant and must be eliminated to reveal the intrinsic spectrum or image.

SUMMARY OF THE INVENTION

The present invention describes how to obtain and process data to create intrinsic spatial images and intrinsic spectra for each pixel of the spatial image. Normally, the boundaries of the illumination are established by averaging the intensity of images of a white standard surface under dark field (0% intensity) and bright field (100% intensity) conditions. A data cube is obtained by scanning a spatial field of view (X and Y axis). This scan is accomplished by fixing the width of one axis while scanning along the other axis. The hyperspectral imaging device (e.g., camera or sensor) simultaneously records the image of a row of pixels and the full spectrum of each pixel in the row. The image of the field of view is generated by reconstructing the rows of pixels into the image of the field of view with each pixel containing its full spectrum. For the purpose of the specification and the invention, the terms imaging device and camera are interchangeably used to denote a device configured to scan and/or obtain hyperspectral images, without limitation or exclusion to other devices configured to perform the same function.

The methodology of creating intrinsic hyper-spectral data cubes requires additional calibration and data acquisition procedures. The data acquisition procedure involves scanning the field of view under focused and diffused conditions. The intrinsic calibration procedure requires focused and diffused scans of the field of view of a white reference surface. The data cube processing follows the intrinsic methodology by using data that has been bounded by the dark and brightfield range and establishing a Zero Order Data Cube where every pixel in the data cube has a spectral value of zero. This is accomplished by subtracting the spectra of the diffuse scan of the white reference surface from the spectra of the focused scan of the white reference surface resulting in a Residual data cube of a scan of the white surface. This spectra of the Residual data cube are added to the spectra of the diffuse data cube of the white reference surface and that sum is subtracted from the focused data cube of the white reference surface yielding a Zero Order Data Cube where all spectral intensities are equal to zero, validating the intrinsic camera setup. To obtain an intrinsic data cube of a field of view of interest, calibration scans of the white surface are obtained under focused and diffused condition and processed by subtracting the diffused calibration data cube from the focused calibration cube, creating a Residual Data Cube, adding it to the diffused data cube of the field of view of interest and subtracting this sum from the focused field of view of interest data cube.

BRIEF DESCRIPTION OF THE DRAWINGS

Further features and advantages of the invention will become apparent from the following detailed description taken in conjunction with the accompanying figures showing illustrative embodiments of the invention, in which.

Figure 1:
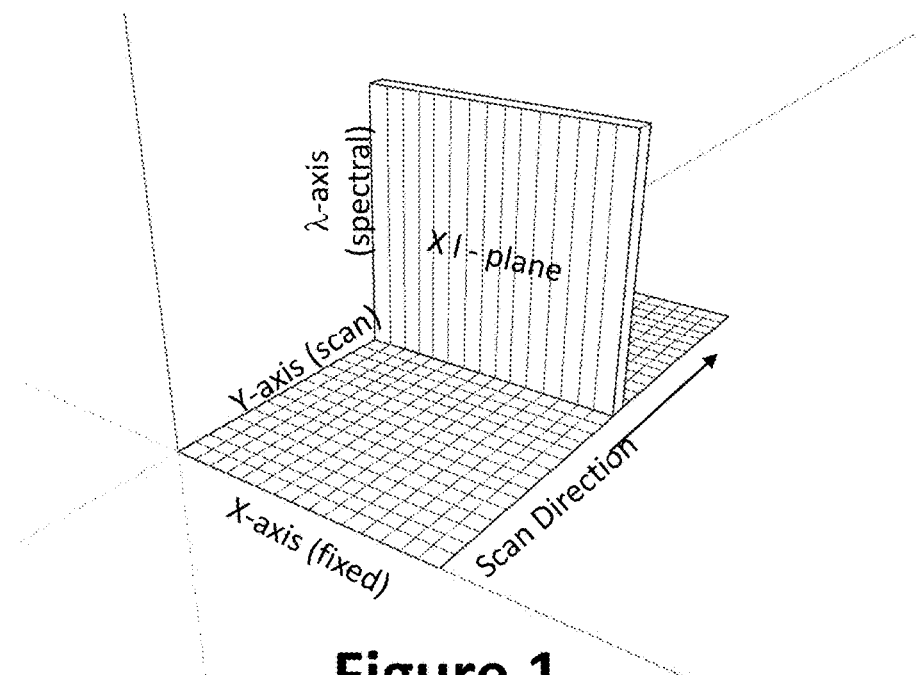
FIG. 1 illustrates the relationship of the three axes when scanning a focused field of view. The plane of x and y axis represents the spatial field of view, whereas the I axis represents the wavelength of the spectrum. The x axis is a fixed number of pixels, whereas the instrument scans along the y axis as a vertical x-I plane to obtain the spatial x-y image and related spectra.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

This invention extends intrinsic methodology into the third dimension where intrinsic spectrum directly represents each pixel in a digital intrinsic image. The importance of this invention is that the intrinsic spectral and image data do not contain irrelevant components that may interfere with the identification and distribution of materials of interest in the field of view. The following methodologies are the basic detailed procedures and processes to create an Intrinsic data cube.

Obtaining the Required Data Cubes

1. Establish the intensity range of the illumination of the system using a white reference surface by covering the camera lens (for example, with a lens cover), and recording the dark level (corresponding to 0% illumination) by imaging the white surface with the camera lens covered. Then, removing the lens cover, increasing the intensity of the illumination to the highest level within the linear intensity range of the camera and imaging the white surface with the camera lens uncovered while keeping in the linear intensity range of the camera (corresponding to 100% illumination).

2. Establish the focus, scan range and scan speed settings of the instrument by placing the material of interest on the white reference surface on the scanning bed and adjusting as needed.

3. Scan and record the spatial and spectral data from the material of interest creating a focused data cube of the material of interest.

4. Place an optically diffusing material between the camera lens and the field of view of the material of interest and scan and record the spatial and spectral data from the material of interest creating a diffused data cube of the material of interest.

5. Remove the material of interest from the scanning bed and scan and record the spatial and spectral data from the white reference surface creating a focused data cube of the white reference surface.

6. Place the optically diffusing material between the camera lens and the field of view of the white reference surface and scan and record the spatial and spectral data from the white reference surface creating a diffused data cube of the white reference surface.

According to an embodiment of the invention, a Headwall hyper-spectral Laboratory System fitted with a camera sensitive to a wavelength range from 400-1000 nm was used to scan and record each scan, where a folder that contained all the files associated to the scan and its respective data cube was generated for each scan.

Specifically, the following files were selectively generated based on the specific scan:

"whiteReference" and "darkReference": set the upper and lower limits (0-100%) of the intensity range as previously determined.

"raw": raw data cube that relates the spectral information to the respective spatial pixels of the image obtained with the scan.

"HS raw": header file of the raw file.

"data": raw data cube normalized to the 0-100% intensity range that relates the spectral information to the respective spatial pixels of the image obtained with the scan.

"HS data": header file of the data file.

"idata": intrinsic data cube normalized to the zero order spectrum using the Residual data cube as explained below.

"HS idata": header file of the idata file.

"image": spatial image of the scan that is used to reveal the specific spectrum related to specific pixels of the image.

The following explanation details the general procedure for processing the obtained Data Cubes to create an Intrinsic Data Cube:

Calibrating the Instrument

1. Subtract the spectra of the diffused data cube of the white surface from the spectra of the focused data cube of the white surface. This creates the Residual data cube, which is based on the illumination data cube of the white surface.

2. Add the spectra of the Residual data cube to the diffused data cube of the white surface.

3. Subtract the sum of step (2) from the focused data cube of the white surface, creating the Zero Order data cube. As will be explained below, the Zero Order data cube can be visualized and evaluated to corroborate that the instrument is calibrated for intrinsic spectra processing.

Creating an Intrinsic Data Cube

1. Add the Residual data cube of the white surface to the diffused data cube of the material of interest to generate a Resulting Data Cube.

2. Subtract the Resulting Data Cube of step (1) from the focused data cube of the material of interest. This results in an Intrinsic data cube of the material of interest that is added to its respective intrinsic focused data cube folder (i.e., "idata" file)

3. The Intrinsic spatial image is created by subtracting, pixel by pixel, the diffuse image from the focused image.

Viewing the Data Cube

1. The Zero Order data cube may be validated by using the focused and diffuse calibration data cubes as if they were the data cubes of the field of view of interest and processing them against themselves treating the focused and diffused data cubes as if they were an empty reference and sample data cube sets. The processed "idata" file is opened with the Headwall SpectralView software and the spectral histogram window associated with the respective "idata" file. By moving the curser over the image of the focused "idata" field of view confirms there is no spectral components contained in the field of view validates that the instrument is setup to process Intrinsic data cubes.

2. The focused Intrinsic data cube can be viewed by opening its associated "idata" file with the Headwall SpectralView software and the associated spectral histogram window. By moving the curser over the image of the field of view, the intrinsic spectrum of each pixel will appear with respect to the location of the curser.

Note that the above-explained methodology is not limited to the order of the steps. For example, the calibration scans may be performed before or after the scans of the field of view of interest. The important requirement is that the area of all four scans needs to be the same for the processing to be successful.

In order to better understand the invention, the following examples will be explained in conjunction with the accompanying figures.

Example 1: Non-Fluorescent Vs. Fluorescent Paint

1. Basic Calibration of the Hyper-Spectral Imaging System

A Headwall hyper-spectral Laboratory System was fitted with a camera sensitive to a wavelength range from 400-1000 nm. The Headwall HyperSpec III instrument control program was used to calibrate the illumination intensity by first collecting Dark images by covering the camera lens and Bright field images at an intensity setting within the linear response of the instrumentation. In this example, the following settings were set for the system: focal distance at 125 mm, scan speed of 3.2 mm/sec, and scan area of 55×70 mm.

2. Intrinsic Calibration of the Hyper-Spectral Imaging System

The system was then calibrated for intrinsic data acquisition by scanning a white reference surface without and with a diffuse material between the camera lens and the white reference surface to provide the focused and diffused calibration data cubes, respectively. The scanning relationship of the X, Y, and I axes of the data cubes is shown in FIG. 1.

Figure 2:
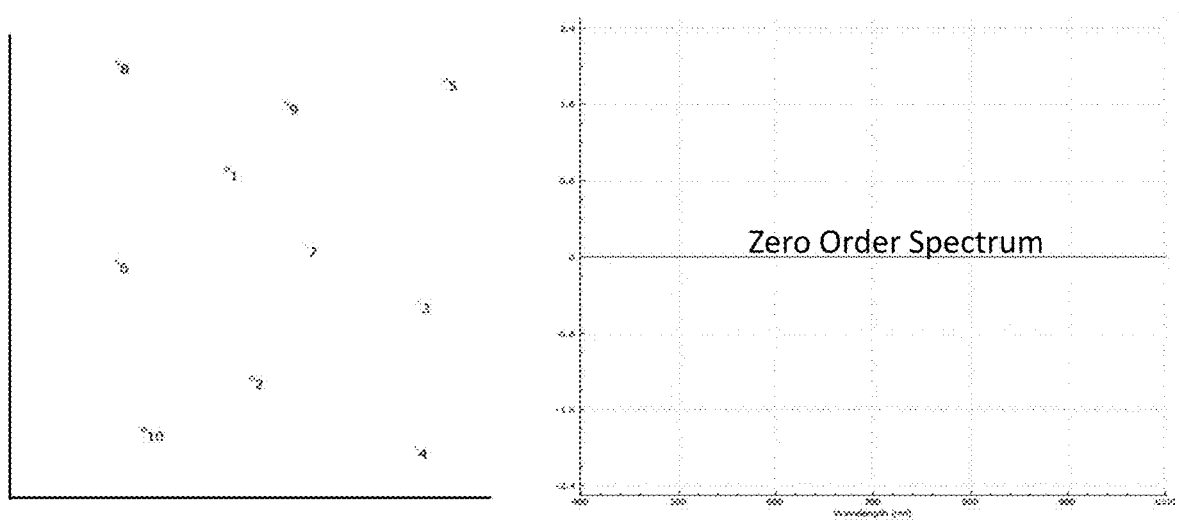
FIG. 2 shows an image of the field of view of a white reference surface with locations of the curser over the image and its corresponding Zero Order Spectra shown in a hyper-spectral plot. Validation of the Zero Order data cube is demonstrated by all the hyperspectra falling on Zero Order Spectrum, i.e., no spectral components, within the white reference surface after intrinsic calibration.

The Residual calibration data cubed was obtained by subtracting the diffused calibration data cube, pixel by pixel, from the focused calibration data cube. The Residual calibration data cube was then added to the diffuse calibration data cube and the resulting data cube was subtracted from the focused calibration data cube, producing a Zero Order data cube. The Zero Order data cube was validated by moving the curser over different positions of the spatial focused image of the scanned white surface while verifying with the Headwall SpectralView software that each pixel contained a Zero Order Spectrum indicating no spectral components within the Zero Order data cube, as demonstrated in FIG. 2.

3. Obtaining Data Cubes of a Field of View Containing a Green Sample.

Figure 3A:
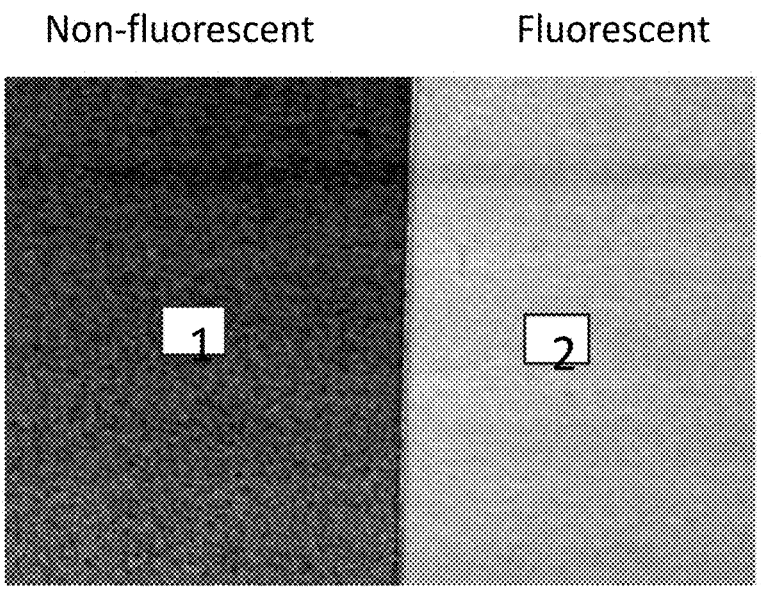
FIG. 3a shows an image containing samples of (1) non-fluorescent green and (2) fluorescent green paint.

A sample of a non-fluorescent green paint and a sample of fluorescent green paint were sprayed on a piece of white velum paper and allowed to dry, as shown in FIG. 3a. The painted paper was placed on the scan bed of the system and using the same instrument settings of the intrinsic calibration, a focused data cube was obtained of the paint samples. The same area of the painted paper was scanned again to collect a diffused data cube by placing a diffuse material between the camera lens and the field of view. The Residual calibration data cube was created by subtracting the diffuse data cube from the focused data cube, then added to the diffuse data cube of the paint samples and this Resulting data cube was subtracted from the focused data cube of the paint samples to generate the Intrinsic data cube of the paint samples. The Intrinsic image of the field of view was created by subtracting the diffused image of the paint samples from the focused image of the paint samples.

4. Obtaining Data Cubes of a Field of View Containing a Red Sample.

Figure 4A:
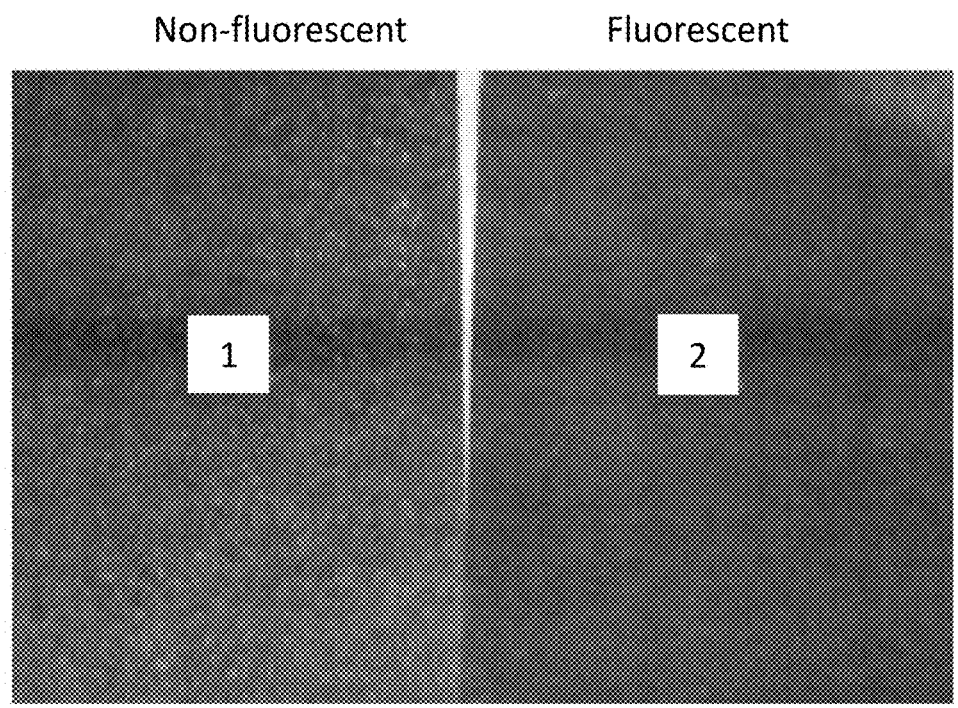
FIG. 4a shows an image containing samples of (1) non-fluorescent red and (2) fluorescent red paint.

A second set of focused and diffused data cubes as well as an intrinsic focused data cube were obtained from samples of red non-fluorescent and red fluorescent paints (FIG. 4a) by following the same procedure used for the green non-fluorescent and green fluorescent paints, as in step 3.

5. Reviewing the Intrinsic Hyper-Spectral Data Cube.

Figure 3B:
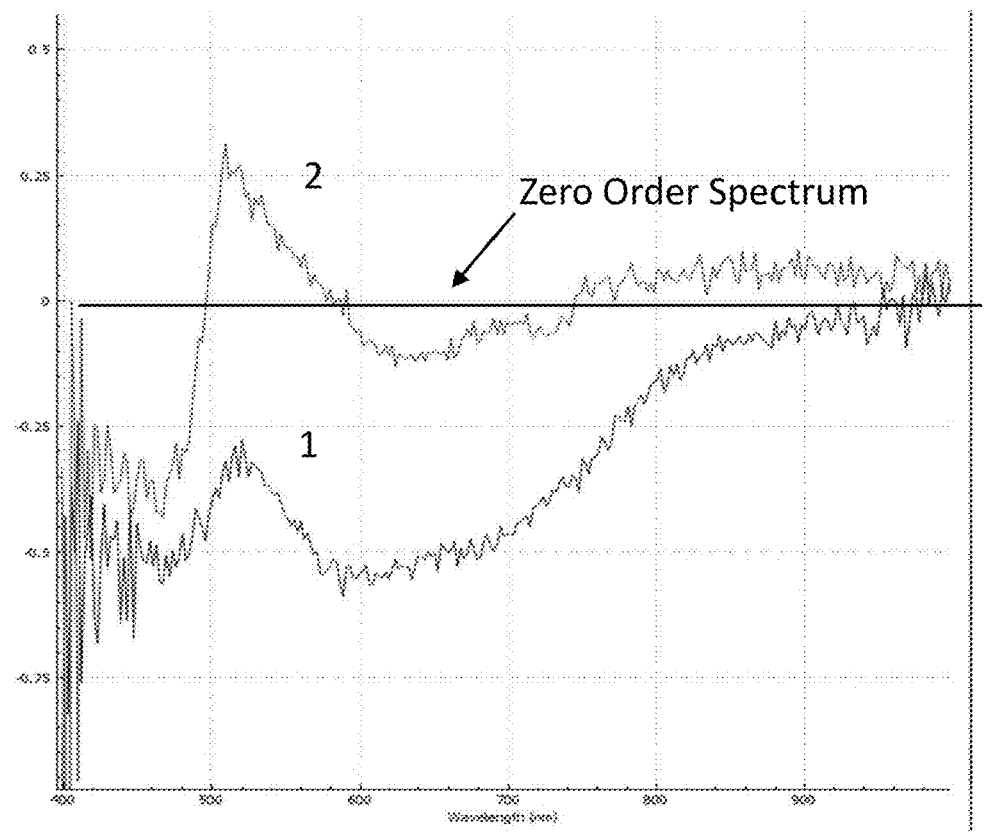
FIG. 3b shows Intrinsic Hyper-spectral plots of the Zero Order Spectrum, (1) non-fluorescent green paint, and (2) fluorescent green paint.

The Intrinsic images and spectra were reviewed across the 400-1000 nm spectral wavelength range with the Headwall SpectralView software. As the curser was moved over pixels of the intrinsic image, the corresponding spectrum was presented in the spectral histogram window of the program. FIG. 3a shows the locations (1) and (2) of the curser in the field of view of the piece of white velum paper with the green paints and FIG. 3b shows the corresponding spectra of the green paints for locations (1) and (2). The spectral components of spectrum (1) of the non-fluorescent paint were all below the Zero Order spectrum, indicating that this is the absorption envelop. However, note the peak (1) near the 520 nm within the absorption envelope correlating to the color green within the absorption envelope, suggesting green reflection. However, the number (2) in FIG. 3a shows the location of the curser in the field of view in the fluorescent paint sample corresponding to spectrum (2) in FIG. 3b with a peak above the Zero Order Spectrum, indicating emission.

Figure 4B:
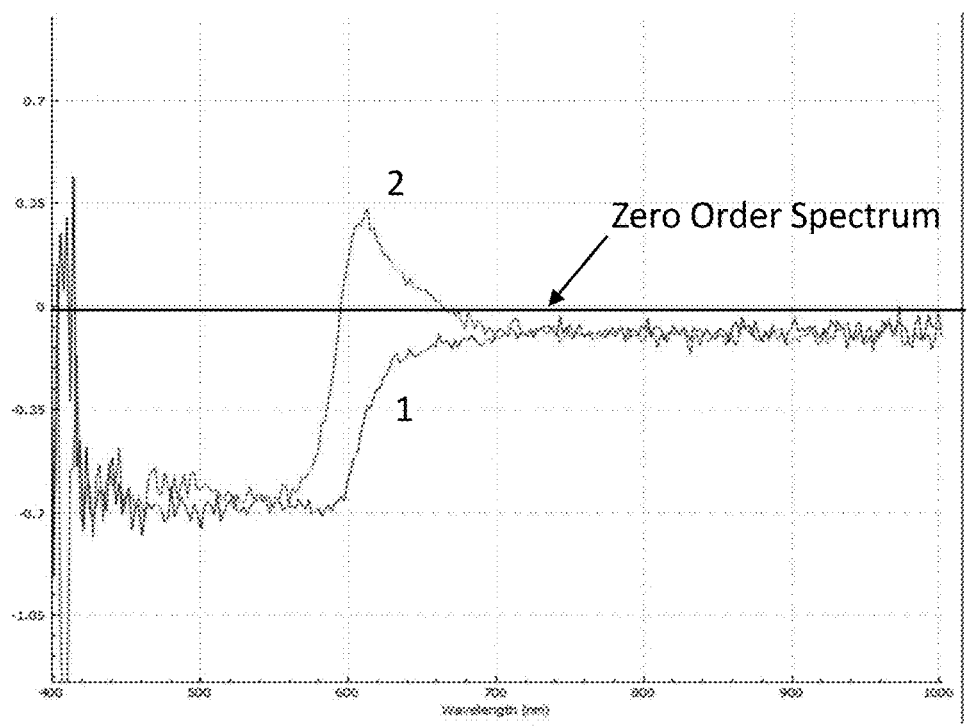
FIG. 4b shows Intrinsic Hyper-spectral plots of the Zero Order Spectrum, (1) non-fluorescent red paint, and (2) fluorescent red paint.

Similar results were obtained using non-fluorescent and fluorescent red paint. The location (1) on the non-fluorescent paint (FIG. 4a) gave rise to spectrum (1) in FIG. 4b where the spectrum was below the Zero Order Spectrum with the highest region was between 610-700 nm, indicating red reflection. However, the location (2) on the fluorescent paint gave rise to spectrum (2) where the 610-700 nm region was above the Zero Order Spectrum, indicating emission.

Example 2: Aerial Field of View Using an Unmanned Aerial Vehicle (UAV)

While the intrinsic data cubes of the previous examples were determined using images obtained in an indoor environment from a Headwall Hyper-spectral Laboratory System, the present intrinsic methodology is also implemented using images obtained in an outdoor environment (e.g., ocean, rivers, lakes, forests, mountains, deserts, ground, roads, etc. . . . ) from a camera/sensor mounted to an unmanned aerial vehicle such as a flying drone. The hyperspectral imaging device can be either removably attached to the drone or embedded as part of the drone.

Generally, hyperspectral images using a drone are obtained by equipping the drone with a hyperspectral imaging camera/sensor specifically designed to capture data at numerous narrow and contiguous bands across the spectrum. Before deploying the drone, a mission flight plan is created by defining the area to be covered, flight altitude, and the specific parameters for data collection. The flight plan is often programmed into the drone's flight control system.

The drone is then launched and follows the predefined flight path navigating through the designated area while capturing images at various wavelengths. The hyperspectral imaging camera/sensor on the drone captures reflected light across multiple bands with each band corresponding to a specific range of wavelengths. Once the drone has completed its flight, the captured raw hyperspectral images are often corrected for factors such as atmospheric interference and sensor calibration and processed to obtain the corresponding hyperspectral data cube.

Figure 5:
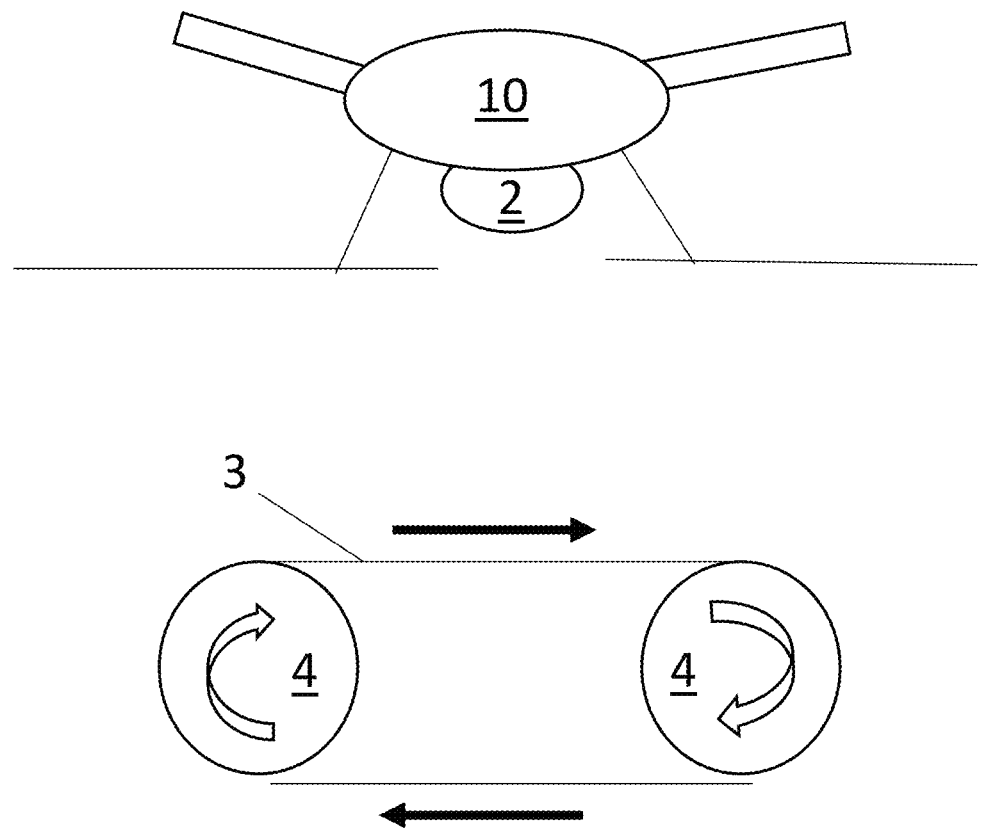
FIG. 5 illustrates a drone obtaining calibration data cubes, according to an embodiment of the invention.

According to an embodiment of the present invention, the intensity illumination range of the hyperspectral camera/sensor 2 used is calibrated by positioning the drone 10 with the camera (or alternatively, only the camera) on a fixed stand with the camera 2 pointed down towards a uniform white surface 3. Preferably, the uniform white surface 3 is provided on a mechanism that has a loop of uniform white material 3 suspended between two rollers 4 that causes the uniform white material to continuously move between the rollers and pass under the camera 2 at a controlled rate simulating scanning the field of view that the drone 10 will be passing over (FIG. 5).

The dark and bright images used to determine the illumination intensity range are obtained by imaging the uniform white material with and without the lens cover in place, respectively. As in the previous examples, the illumination intensity range and the camera/sensor parameters such as focal distance, scan speed, etc. . . . are determined and/or set, accordingly.

The second set of calibration data cubes used for calibrating the hyper-spectral Imaging system of the invention is obtained by imaging the moving white material with the rollers to simulate a specific scan distance, wherein the focused calibration data cube of the white surface is obtained with the lens uncovered and the diffused calibration data cube of the white surface is obtained by covering the lens with the diffuse material, as in the previous examples. There might be instances where the imaged area (X-Y axes) of the white surface does not coincide with the field of view area (X-Y axes). According to an embodiment of the invention, any difference in the number of pixels and/or rows is adjusted by simply combining and/or adding the necessary number of pixels and/or rows of the imaged scanned area of the white surface to equal the same scan area that the drone covers in the field of view. For example, a scanned image of the white surface results in a 6×10 matrix of pixels (e.g., a row of 6 pixels along the X-axis and 10 rows of pixels along the Y-axis) and a scanned field of view results in a 10×15 matrix of pixels (e.g., a row of 10 pixels along the X-axis and 15 rows of pixels along the Y-axis). Then, the X axis of the scanned white surface image will be adjusted by selecting a pixel on the X-axis row and adding that pixel four times to obtain a 10 pixels row along the X axis. In addition, the Y axis of the scanned white surface image will be adjusted by selecting a row of pixels along the X-axis and adding that row of pixels 5 times to obtain 15 rows of pixels along the Y axis. While in this example, a single pixel and a single row of pixels is used to adjust the imaged area, it is also envisioned that plural pixels and/or rows of pixels can be selected and used to adjust the imaged area in accordance with the previous explanation. It will be understood that in this embodiment, the scanned white surface image can be adjusted only along the X axis, only along the Y axis, or along both the X and Y axes. This approach assumes that illumination is uniform throughout the entire surface of the white reference material.

Figure 7:
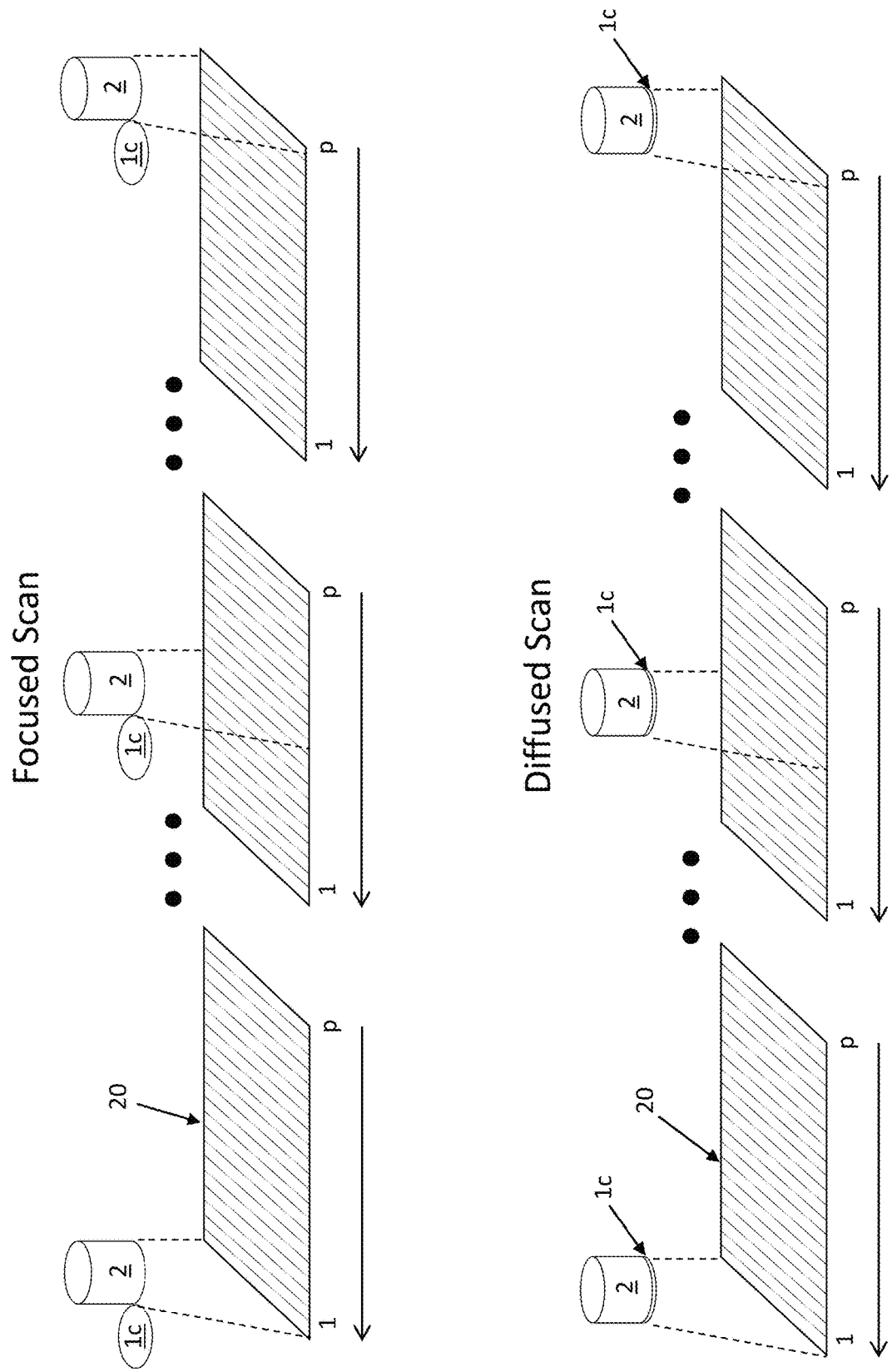
FIG. 7 illustrates a configuration of an imaging device scanning a field of view with and without the lens covered by a diffuse material.

Now, according to the present invention, the drone is then launched and follows the predefined flight path to obtained the focused and diffused data cubes of the field of view. This can be accomplished in several ways. For example, the drone can follow the predefined flight path with the camera lens uncovered and then repeat the same predefined flight path but with the lens covered with the diffuse material, as illustrated in FIG. 7. Alternatively, the lens can be covered with a dual-slit cover longitudinally oriented in the X axis direction and having one uncovered slit next to another slit covered with the diffuse material. In this embodiment, the camera will be scanning both the focused and diffused image of the field of view at the same time and the drone flight plan needs to be adjusted to ensure that both images contain the same amount of Y-axis rows. For example, when a focused data cube reaches the 100$^{th}$ row of pixels along the Y axis, a diffused data cube would simultaneously reach the 99$^{th}$ row of pixels along the Y axis. At this point, the camera is controlled to perform only one additional scan row of pixels for the diffused data cube so that both the focused and the diffused data cubes would have the same area of 100 rows of pixels along the Y axis. Regardless of the scanning approach used, it is important to ensure that both, the focused and the diffused data cubes of the field of view comprise the same number of rows corresponding to the same scanned area.

According to an embodiment of the invention as explained in U.S. Pat. No. 11,151,736 B1 to Schwartz et al., incorporated in its entirety herein by reference, a hyper-spectral camera with a conventional slit 1 ((a) on FIG. 6) can be converted to an intrinsic hyper-spectral camera by increasing the opening of the field of view slit by a factor of two and providing a translucent material 1$c$ over half of the increased opening to provide a slit arrangement having a focused portion 1$a$ and a diffused portion 1$b$, as shown in (b) on FIG. 6. Alternatively, the slit arrangement may also have two individual equal sized slits separated by a distance z with one opened focused portion slit 1$a$ and another diffused portion slit 1$b$ provided with a translucent material 1$c$, as shown in (c) on FIG. 6. These slit arrangements allow the camera to take an exposure of a focused and a diffuse field of view at the same time. However, it is important to note that the further apart the focused and diffuse portions are on the slit arrangement, the greater the difference in data acquisition between the focused and diffuse data, which can introduce variations in the foreground environment. When scanning a field of view of interest with the hyper-spectral camera, the positions of the location of the two fields of view are staggered such that the diffused field of view exposure is exposing a different location than the focused field of view. To perform the intrinsic spectral processing, the focused and diffuse fields of view must be of the same location. This is accomplished by correlating the locations of the focused and diffuse spectra.

Figure 8:
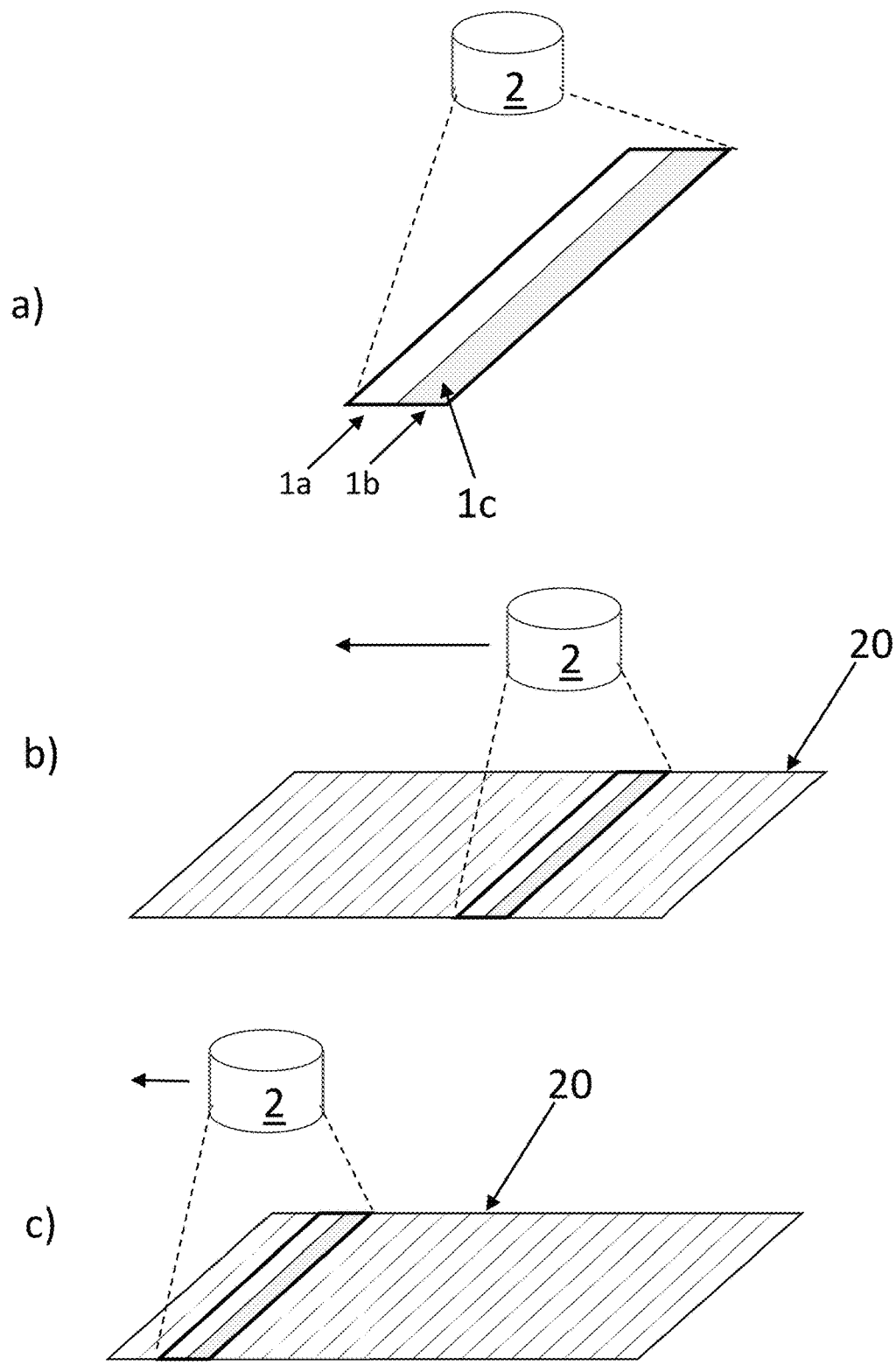
FIG. 8 illustrates in (a) a hyper-spectral camera and the field of view through a slit arrangement where images are obtained. The field of view is divided in half with the leading half open to obtain focused data and the trailing half covered with a diffuse material to obtain diffuse data, in (b) and (c) the illustrations show the hyper-spectral camera with the slit arrangement scanning a field of view.

As can be appreciated from FIG. 8, a slit arrangement according to an embodiment of the invention provides that a lens of a camera 2 is positioned with respect to the focused open slit portion 1$a$ which is adjacent to diffused slit portion 1$b$ having the translucent material 1$c$ and the drone with the camera 2 flies above the field of view 20 simultaneously scanning and obtaining focused and diffused data cubes of the field of view 20.

To better understand how these data cubes are generated, the following examples will be explained in conjunction with the illustrations in FIGS. 9-10. The field of view is represented by a hyper-spectral camera mounted on a flying drone that is scanning a field of view from a fixed altitude. The field of view from the drone moves along the X axis from right to left, exposing new locations. The following mathematical expressions represent the data obtained within the fields of view for the data cube using the slit arrangement (b) illustrated in FIG. 6.

$$\frac{X_p}{X_1}\left[X_{n+1\lambda S_f}\right]_{Y_1}^{Y_m} \quad \frac{X_p}{X_1}\left[X_{n\lambda S_d}\right]_{Y_1}^{Y_m} \quad \text{Position } n$$

$$\frac{X_p}{X_1}\left[X_{n+2\lambda S_f}\right]_{Y_1}^{Y_m} \quad \frac{X_p}{X_1}\left[X_{n+1\lambda S_d}\right]_{Y_1}^{Y_m} \quad \text{Position } n+1$$

where:
n is an initial position of scanning;
X is the horizontal direction of scanning between the limits of 1-p of the field of view;
Y is the vertical length of the field of view between the limits of 1-m;
$\lambda_{sd}$ is the diffuse spectra of the field of view across the limits 1-m of Y; and
$\lambda_{sf}$ is the focused spectra of the field of view across the limits 1-m of Y.

Figure 6:
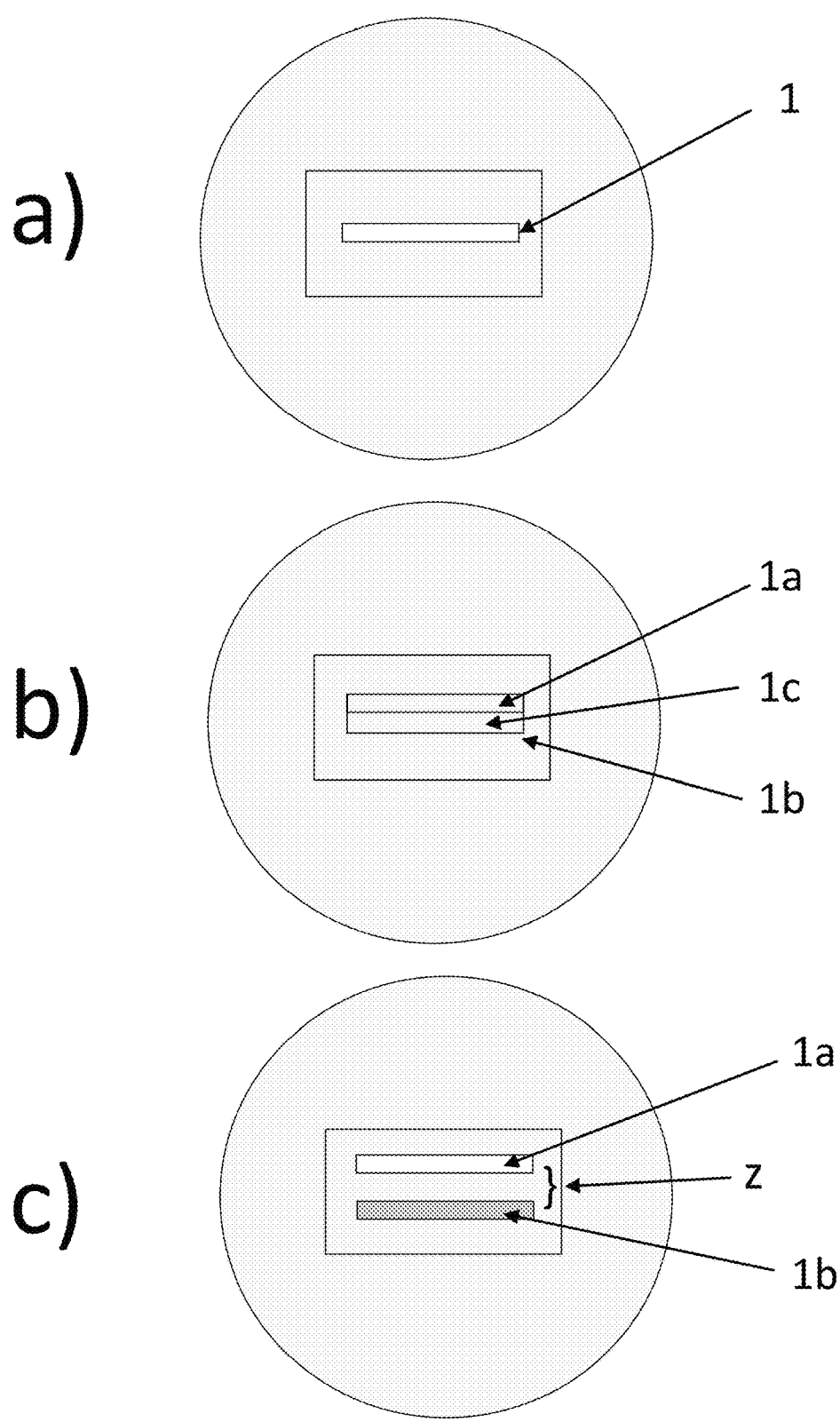
FIG. 6 illustrates in (a) the structure of a classic slit apparatus within a hyper-spectral camera with a simple opening, in (b) the structure of a slit apparatus with an opening twice the width where a diffuse material covers half the width of the slit, and in (c) the slit apparatus having two separated equal sized slits with one open and one covered with a diffuse material.

Alternatively, the field of view exposed through the slit arrangement can be indicated by one rectangle comprised of a focused (open/uncovered) portion and another individual rectangle comprised of a diffused (translucent) portion separated from the focused portion by a distance z as illustrated by (c) in FIG. 6. The following mathematical expressions represent the data obtained within the fields of view for the data cube using the slit arrangement (c) illustrated in FIG. 6.

$$\frac{X_p}{X_1}\left[X_{n+h\lambda S_f}\right]_{Y_1}^{Y_m} \quad \frac{X_p}{X_1}\left[X_{n\lambda S_d}\right]_{Y_1}^{Y_m} \quad \text{Position } n$$

$$\frac{X_p}{X_1}\left[X_{n+h+1\lambda S_f}\right]_{Y_1}^{Y_m} \quad \frac{X_p}{X_1}\left[X_{n+1\lambda S_d}\right]_{Y_1}^{Y_m} \quad \text{Position } n+1$$

where:
n is an initial position of scanning;
h is the number of column of pixels separating the generated pair of columns +1;
X is the horizontal direction of scanning between the limits of 1-p of the field of view;
Y is the vertical length of the field of view between the limits of 1-m;
$\lambda_{sd}$ is the diffuse spectra of the field of view across the limits 1-m of Y; and
$\lambda_{sf}$ is the focused spectra of the field of view across the limits 1-m of Y.

According to the above explained examples, scanning of the field of view is carried out in the X direction from right to left and the diffuse portion is shown on the right-side portion and the focused portion is shown on the left side portion of the slit arrangement. These parameters are selected from a practical standpoint, since as part of the calibration process of the hyper-spectral camera, a focusing step is needed prior to begin the scanning procedure. Accordingly, since the scanning is done from right to left, the slit arrangement (with the diffuse portion provided on the right portion) will allow the hyper-spectral camera to obtain the diffuse spectra of the last desired position (e.g., n+5) on the field of view of interest. Since the focused portion is positioned on the left side of the slit arrangement, the focused spectra of the last desired position (e.g., n+5) has already been obtained in the scan. However, scanning can also be carried out from left to right and/or the diffuse portion can be provided on the left-side portion and the focused portion is shown on the right-side portion of the slit arrangement as long as the hyper-spectral camera system and/or associated software is able to accurately determine and correlate each scanning step of the field of view of interest with the corresponding focused and diffused spectra along with their respective positions $$\left(\text{i.e., } X_{n+2\lambda S_f} \text{ and } X_{n\lambda S_d} \ldots\right)$$

obtained using the specific split arrangement selected.

Figure 9:
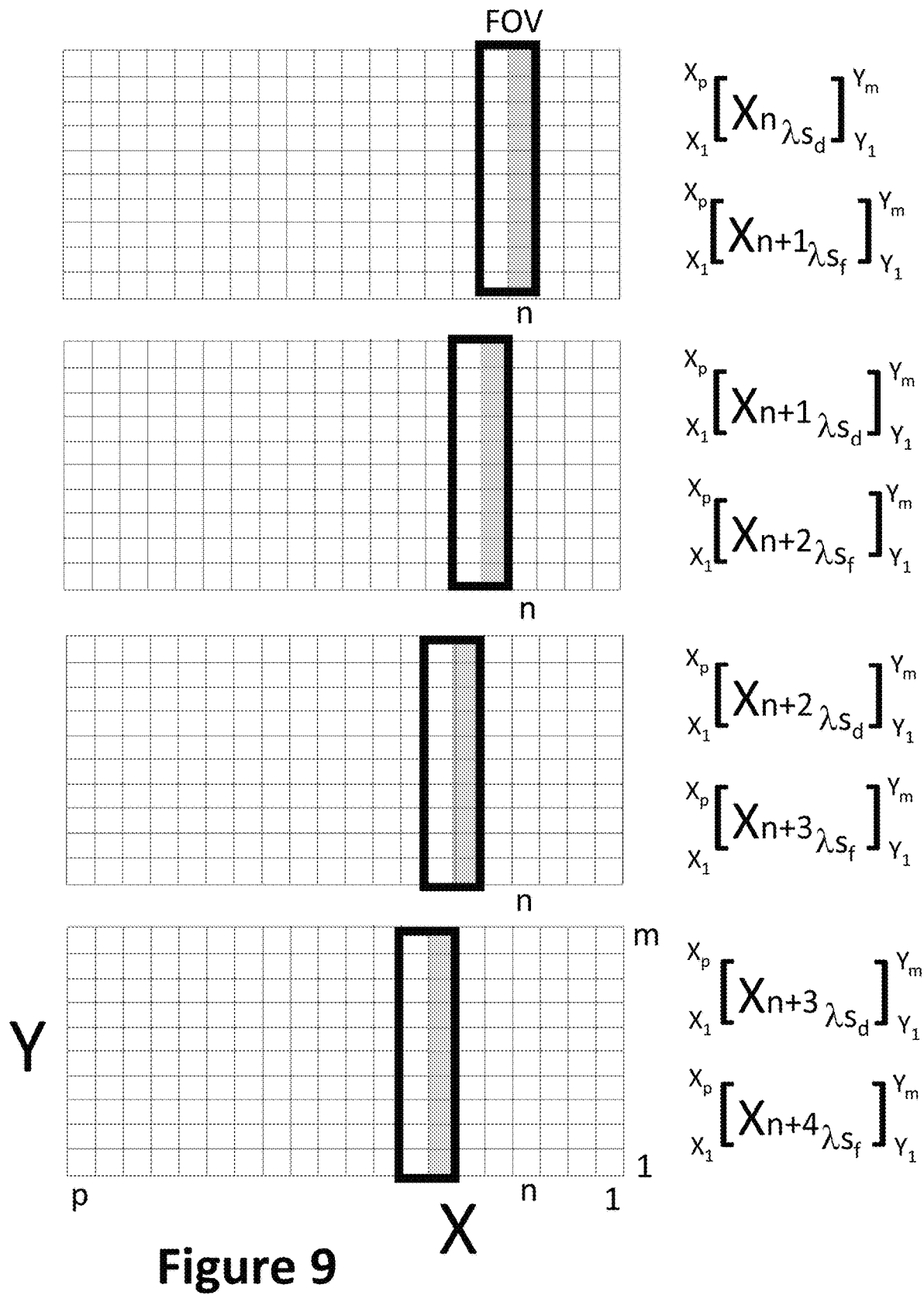
FIG. 9 illustrates the field of view through a slit arrangement as the hyper-spectral camera travels along the Y axis gathering data and the respective mathematical expressions of the field of view for each half of the slit arrangement.
Figure 10:
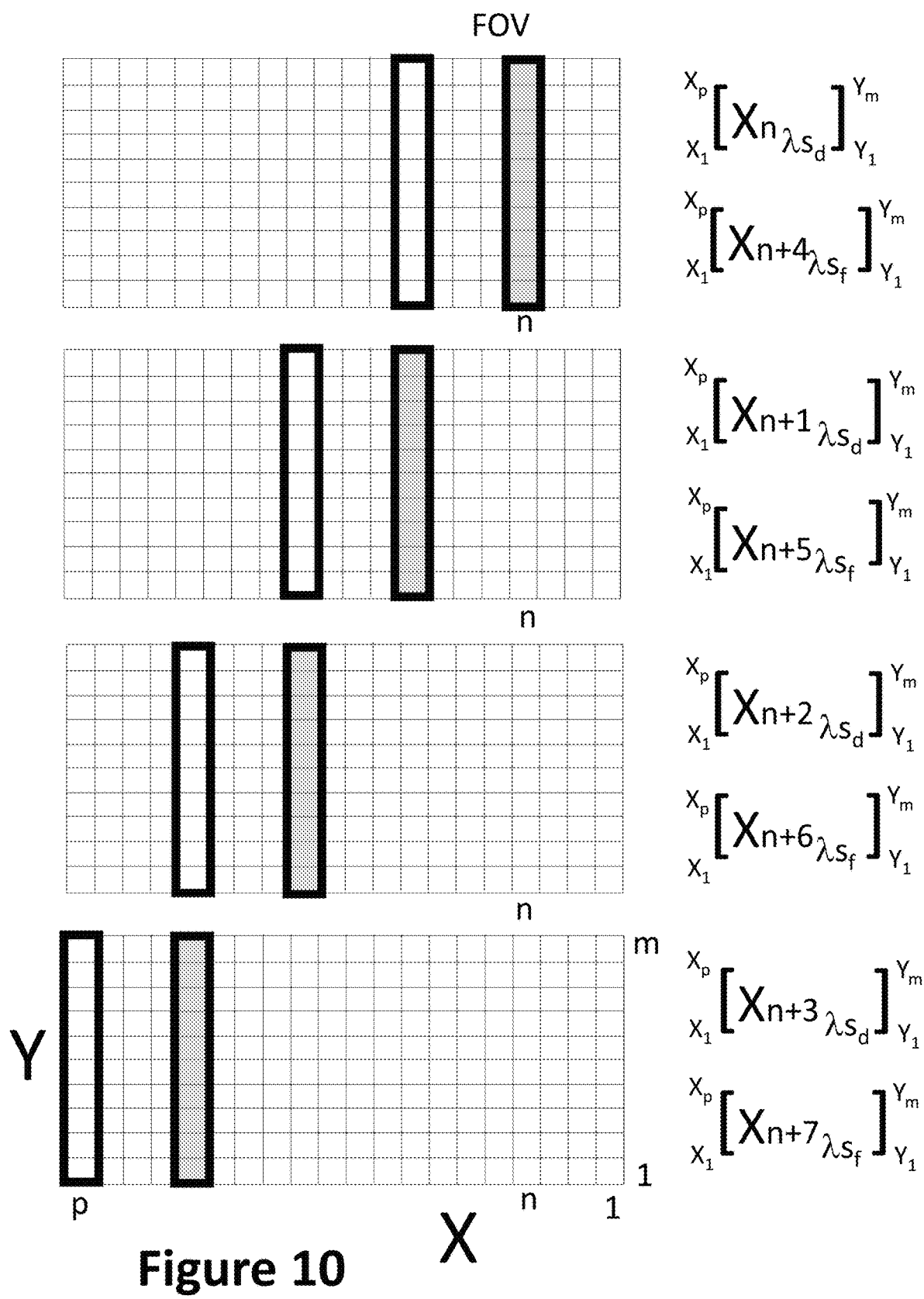
FIG. 10 illustrates the field of view through another slit arrangement as the hyper-spectral camera travels along the Y axis gathering data and the respective mathematical expressions of the field of view for each half of the slit arrangement.

According to the examples, a field of view is represented by a pixel matrix array (p,m) as generated by a hyper-spectral digital camera, where the X direction limits are established from a position n=1 to a position n=p and the width Y of the field of view is represented by the limits from a pixel 1 to a pixel m (see FIGS. 9-10). It is important to understand that according to the present invention, a field of view of interest is considered to be any portion of the viewable field of view. In this regard, it is possible that a user is interested in obtaining a hyper-spectral data cube of the entire field of view in which case the X and Y limits of the field of view of interest will coincide with the X and Y limits of the entire field of view achievable by the hyper-spectral camera. Alternatively, a user might be interested in obtaining hyper-spectral data cube of only a portion of the entire field of view in which case the X and/or Y limits of the field of view of interest will not necessarily coincide with the X and/or Y limits of the entire field of view achievable by the hyper-spectral camera. For example, as illustrated in FIG. 8, a user can only obtain focused and diffused spectral images from an initial position where the n=4 and a final position where n=7 by using the slit arrangement where the scanning process will stop when the slit arrangement reaches the position where n=7. According to this example, a hyper-spectral intrinsic data cube can be generated from a portion of the field of view between n=1 and n=3 since focused and diffused spectral images for only these positions will be obtained during the scanning process. It should be evident that when a hyper-spectral intrinsic data cube is desired between an initial and a final position of the field of view, the scanning process must be carried out so that focused and diffused spectral images for both the initial and the final positions are obtained so that the intrinsic processing methodology can be applied to generate a hyper-spectral intrinsic data cube between the desired limits. Accordingly, it is envisioned that a field of view of interest can be: 1) the entire field of view achievable by the hyper-spectral camera (i.e., X-Y limits), 2) a field of view including the entire Y direction limits but including only a portion of the X direction limits, 3) a field of view including the entire X direction limits and a portion of the Y direction limits or, 4) a field of view including a portion of the Y direction limits and a portion of the X direction limits.

For the purpose of this specification and the invention, the phrase "a field of view of interest" means and includes any of the four possible field of view of interest explained above. Moreover, the term "a field of view of interest" is intended to include, without limitations, at least a portion of a view of an area of interest, a material of interest located within said area of interest or a material of interest positioned over a reference surface such as but not limited to a base of a hyperspectral imaging system. In addition, the term "material of interest" is intended to include, without limitations, any object, human or animal located within the field of view, a portion of the field of view or the entire field of view.

After the field of view exposures are obtained through the slit arrangement, all the focused spectral data columns are sequentially combined (i.e., n, n+1, n+2 . . . , p) to form a pixel matrix array of the focused field of view and all the diffused spectral data columns are sequentially combined to form a pixel matrix array of the diffused field of view. This is performed by software running in a computer or a processing unit external and/or integrated into the camera that processes the focused and diffused spectral data obtained and spatially correlates each pixel of the column generated with a corresponding spatial position in the analog field of view of interest. In the case of the slit arrangement having the focused and the diffused slits separated by a distance z, the software uses the distance z to determine the separation of columns of pixels between the generated pair of columns. In both cases, the exact spatial correlation between the generated pair of columns of pixels and their associated position on the analog field of view is determined in order to ensure that the focused and diffused spectral data columns are sequentially combined $$\left(\text{i.e., } X_{n_{\lambda S_f}}, X_{n+1_{\lambda S_f}}, X_{n+2_{\lambda S_f}} \cdots \text{ and } X_{n_{\lambda S_d}}, X_{n+1_{\lambda S_d}}, X_{n+2_{\lambda S_d}}\right)$$

to form respective focused and diffused pixel matrix arrays

Finally, once the focused and diffused data cubes are generated, the methodology of the present invention is applied to obtain the corresponding intrinsic data cube of the field of view, in accordance to the present invention.

According to a preferred embodiment of the invention, the method is implemented on both indoor and outdoor applications by performing a single scan along the X axis of the white reference surface during the calibration steps. For the purpose of the specification and the invention, a single scan along the X axis generates a data cube having at least one row of pixels along the X axis, where the number of rows will be determined by at least one of: the height of the camera in relation to the white reference surface or the width of the slit covering the camera lens, but will always be less than the total number of rows of the entire field of view of interest. While the following methodology will be explained with a single scan along the X axis generating a data cube having only one row of pixels, it is to be understood that the method is equally performed with a single scan along the X axis generating a data cube having more than one row of pixels where all the addition and subtraction steps of the method are adjusted and performed based on the number of rows.

Single Row Scan Method

1. Perform an X-axis scan of a single row of pixels of the white reference surface without the lens of the camera covered to generate a White Reference Data Cube comprising of a single row of pixels, and perform an X-axis scan of a single row of pixels of the white reference surface with the lens of the camera covered to generate a Dark Reference Data Cube comprising of a single row of pixels. The illumination intensity range and the camera/sensor parameters such as focal distance, scan speed, etc. . . . are determined and/or set, accordingly.

2. Perform an X-axis scan of a single row of pixels of the white reference surface with the lens of the camera covered with the diffuse material to generate a Diffuse Data Cube of the white reference surface comprising of a single row of pixels.

3. Scan the field of view of interest to generate a Focused Data Cube and a Diffused Data Cube of the field of view of interest.

4. Subtract the one-row Diffused Data Cube of the white reference surface from the one-row White Reference Data Cube to generate a one-row Residual Data Cube.

5. Add the one-row Residual Data Cube to each X-axis row of the Diffuse Data Cube of the field of view of interest to generate a Resulting Data Cube.

6. Subtract the Resulting Data Cube from Focused Data Cube of the field of view of interest to generate the Intrinsic Data Cube of the field of view of interest.

As can be appreciated, performing calibration scans over an X-Y area corresponding to the entire field of view of interest as well as using a loop of uniform white material suspended between two rollers are avoided by scanning only a single row of pixels of the white reference surface and as a consequence, the total time of carrying out the inventive method is decreased and the size of the data files generated are reduced by approximately 50%. This assumes that one row of pixels represents the uniformity of the entire surface of the white reference material. Note that if necessary, the number of pixels on the row can also be adjusted by adding additional pixels as previously explained so that the size of the X axis of the White Reference Data Cube and the Diffuse Data Cube of the white reference surface coincide with the size of the X axis of the Focused and Diffused Data Cubes of field of view of interest.

In the case where the single line scans of the white reference surface generates a Focused Data Cube and a Diffused Data Cube of the white reference surface having more than one row of pixels, for example six rows of Focused pixels, then the six-rows of Diffuse Data Cube of the white reference surface will be subtracted from the six-rows of Focused Data Cube of the white reference to generate a Residual Data Cube having six rows. As previously explained, if necessary, the number of pixels of the six rows is adjusted by adding the necessary number of pixels per row so that the size of the X axis of the imaged scanned area of the white reference surface coincides with the size of the X axis of the scan area that the drone covers in the field of view. Then, the six-row Residual Data Cube will be added to the Diffuse Data Cube of the field of view of interest on a six rows by six rows basis until the entire length of the Y axis rows is reached truncating any X-axis row of the Residual Data Cube not needed to generate a Resulting Data Cube having the same X-Y area as the field of view of interest. Afterwards, the Resulting Data Cube is subtracted from the Focused Data Cube of the field of view of interest to produce the Intrinsic Data Cube of the field of view of interest.

In one aspect of the invention, a non-transitory computer readable storage medium is provided to store at least one program for generating intrinsic data cubes of a field of view of interest configured for execution by at least one processor of a computer system.

In one embodiment, the at least one program includes instructions for: scanning a field of view of a reference surface with and without a diffuse material between a camera lens of a hyper-spectral imaging device and said field of view of said reference surface to obtain diffused and focused calibration data cubes of said reference surface, respectively; subtracting, pixel by pixel, the diffused data cube of said reference surface from the focused data cube of said reference surface to obtain a residual calibration data cube; scanning a field of view of a material of interest placed on said reference surface with and without a diffuse material between said camera lens and said field of view of said material of interest placed on said reference surface to obtain diffused and focused data cubes of said material of interest, respectively; adding said residual calibration data cube to the diffuse data cube of the material of interest to obtain a resulting data cube; and subtracting said resulting data cube from the focused data cube of the material of interest to generate an intrinsic data cube of the material of interest.

In another embodiment, the at least one program includes instructions for: generating a residual calibration data cube by subtracting a diffused calibration data cube of a reference surface from a focused calibration data cube of the reference surface, wherein said focused calibration data cube is generated from focused image data of a field of view of the reference surface obtained from a hyper-spectral imaging device, and said diffused calibration data cube is generated from diffused image data of the field of view of the reference surface obtained from the hyper-spectral imaging device; generating a resulting data cube by adding said residual calibration data cube to a diffuse data cube of a field of view of interest, wherein said diffuse data cube of the field of view of interest is generated from diffused image data of the field of view of interest obtained from said hyper-spectral imaging device; and generating an intrinsic hyper-spectral data cube of the field of view of interest by subtracting said resulting data cube from a focused data cube of the field of view of interest, wherein said focused data cube of the field of view of interest is generated from focused image data of the field of view of interest obtained from said hyper-spectral imaging device.

Embodiments of the present invention may be implemented in hardware, firmware, software, or any combination thereof. Embodiments of the present invention may also be implemented as instructions stored on a machine-readable medium. These are readable and executable by one or more processors. A machine-readable medium includes any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it acknowledged that such descriptions are merely for convenience. Such actions in fact result from computing devices, processors, controllers, or other devices executing the firmware, software, routines, instructions, etc. The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this specification, a computer readable storage medium may be any non-transitory, tangible medium that can contain, or store a program for use by or in connection with an instruction execution system, apparatus, or device. Storage and services may be integrally included with the hyperspectral imaging system or remote such as in the "cloud".

It is also envisioned that the at least one processor, the at least one memory/computer readable storage medium or both can be integrated into the hyperspectral imaging device. Alternatively, the at least one processor, the at least one memory/computer readable storage medium or both can be provided on a separate computing station, such as but not limited to, a computer desktop, a laptop, tablet or a smartphone. As is well understood in the art, additional components, such as but not limited to, input/output peripherals, audio/video cards, power supplies, wireless and wired network cards, can also be provided or required in conjunction with the at least one processor and the at least one computer readable storage medium to perform the steps, acts or operations of the present invention.

According to an embodiment of the invention, all the steps, acts or operations are performed using the same processor and the same memory/computer readable storage medium. In another embodiment, some of the steps, acts or operations are performed using one processor while other steps, acts or operations are performed using a different processor. For example, one processor can execute the instructions to perform the steps, acts or operations of scanning a field of view while a different processor can execute the instructions to perform the steps, acts or operations of generating the residual calibration data cube. In addition, it is also envisioned that instructions for performing some of the steps, acts or operations are stored in one computer-readable storage medium and instructions for performing other steps, acts or operations are stored in another computer-readable storage medium. For example, one computer-readable storage medium can store instructions that when executed by a processor performs the steps, acts or operations of scanning a field of view and another computer-readable storage medium can store instructions that when executed by a processor performs the steps, acts or operations of generating the residual calibration data cube.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. A method of generating an intrinsic hyper-spectral image of a field of view of interest, said method comprising:
    scanning a field of view of a reference surface with and without a diffuse material between a camera lens of a hyper-spectral imaging device and said field of view of said reference surface to generate diffused and focused calibration data cubes of said reference surface, respectively;
    subtracting, pixel by pixel, the diffused calibration data cube of said reference surface from the focused calibration data cube of said reference surface to generate a residual calibration data cube;
    scanning a field of view of interest with and without a diffuse material between said camera lens and said field of view of interest to generate diffused and focused data cubes of said field of view of interest, respectively;
    adding said residual calibration data cube to the diffuse data cube of the field of view of interest to generate a resulting data cube;
    and subtracting said resulting data cube from the focused data cube of the field of view of interest to generate an intrinsic data cube of the field of view of interest.

2. The method of claim 1, wherein said reference surface is white.

3. The method of claim 1, wherein all the scanning steps are carried out at a predetermined focal distance, scan area and scan speed.

4. The method of claim 1, wherein an illumination intensity range of the hyper-spectral imaging device is established by scanning the reference surface with the camera lens covered to obtain a 0% illumination level; and scanning the reference surface with the camera lens uncovered to obtain a 100% illumination level.

5. The method of claim 1, wherein each scanning step generates data associated with lower and upper intensity values of an illumination intensity range of said hyper-spectral imaging device; a raw data cube relating spectral information of the field of view of interest scanned to respective spatial pixels of the field of view scanned; and a processed data cube corresponding to said raw data cube having spectral intensities normalized to said illumination intensity range of the hyper-spectral imaging device.

6. The method of claim 4, wherein each scanning step further generates data associated with a spatial image of the field of view scanned.

7. The method of claim 1, wherein said field of view of interest comprises a material of interest positioned on said reference surface.

8. The method of claim 1, wherein said field of view of interest comprises a view of an outdoor environment.

9. The method of claim 1, wherein said hyper-spectral imaging device is either removably attached to or embedded into an Unmanned Aerial Vehicle (UAV).

10. The method of claim 1, wherein the steps of scanning the field of view of the reference surface with and without a diffuse material comprise scanning only a single row of pixels along an X axis of said reference surface to generate the diffused and focused calibration data cubes of said reference surface having a single row of pixels along the X axis.

11. The method of claim 10, wherein the step of subtracting, pixel by pixel, the diffused calibration data cube from the focused calibration data cube comprises subtracting the single row of pixels of said diffused calibration data cube from the single row of pixels of said focused calibration data cube to generate the residual calibration data cube having a single row of pixels along the X axis.

12. The method of claim 11, wherein the step of adding said residual calibration data cube to the diffuse data cube of the field of view of interest comprises adding the single row of the residual calibration data cube to each X-axis row of said diffuse data cube of the field of view of interest to generate the resulting data cube.

13. The method of claim 1, wherein the steps of scanning the field of view of the reference surface with and without a diffuse material comprise scanning a plurality of X-axis rows of pixels along a Y axis of said reference surface, the number of said plurality of X-axis rows of pixels along a Y axis of said reference surface being less than the total number of X-axis rows of pixels along a Y axis of the entire field of view of interest, and said diffused and focused calibration data cubes of said reference surface have a plurality of X-axis rows of pixels along the Y axis equal to the number of X-axis rows along the Y axis of said reference surface.

14. The method of claim 13, wherein the step of subtracting, pixel by pixel, the diffused calibration data cube from the focused calibration data cube comprises subtracting the plurality of rows of the diffused calibration data cube from the plurality of rows of said focused calibration data cube to generate the residual calibration data cube having a plurality of rows of pixels along the X axis equal to the number of rows of the plurality of rows of said diffused calibration data cube and said focused calibration data cube.

15. The method of claim 14, wherein the step of adding said residual calibration data cube to the diffuse data cube of the field of view of interest comprises adding the plurality of rows of the residual calibration data cube to the X-axis rows of said diffuse data cube of the field of view of interest to generate the resulting data cube having a size equal to the size of the focused and diffuse data cubes of the field of view of interest.

16. A method of generating an intrinsic hyper-spectral data cube of a field of view of interest, said method comprising:

generating a residual calibration data cube by subtracting a diffused calibration data cube of a reference surface from a focused calibration data cube of the reference surface, wherein said focused calibration data cube is generated from focused image data of a field of view of the reference surface obtained from a hyper-spectral imaging device, and said diffused calibration data cube is generated from diffused image data of the field of view of the reference surface obtained from the hyper-spectral imaging device;

generating a resulting data cube by adding said residual calibration data cube to a diffuse data cube of a field of view of interest, wherein said diffuse data cube of the field of view of interest is generated from diffused image data of the field of view of interest obtained from said hyper-spectral imaging device; and generating an intrinsic hyper-spectral data cube of the field of view of interest by subtracting said resulting data cube from a focused data cube of the field of view of interest, wherein said focused data cube of the field of view of interest is generated from focused image data of the field of view of interest obtained from said hyper-spectral imaging device.

17. The method of claim 16, wherein said reference surface is white.

18. The method of claim 16, wherein said field of view of interest comprises a material of interest positioned on said reference surface.

19. The method of claim 16, wherein said field of view of interest comprises a view of an outdoor environment.

20. The method of claim 16, wherein the residual calibration data cube comprises a single X-axis row of pixels.

21. The method of claim 16, wherein the residual calibration data cube has a plurality of X-axis rows of pixels along the Y axis of said reference surface, the number of said plurality of X-axis rows of pixels along a Y axis of said reference surface being less than the total number of X-axis rows of pixels along a Y axis of the entire field of view of interest.

22. The method of claim 16, wherein the resulting data cube has a size equal to the size of the focused and diffuse data cubes of the field of view of interest.

23. At least one computer-readable storage medium storing instructions for generating an intrinsic hyper-spectral image of a field of view of interest that when executed instruct at least one processor to perform acts comprising:

generating a residual calibration data cube by subtracting a diffused calibration data cube of a reference surface from a focused calibration data cube of the reference surface, wherein said focused calibration data cube is generated from focused image data of a field of view of the reference surface obtained from a hyper-spectral imaging device, and said diffused calibration data cube is generated from diffused image data of the field of view of the reference surface obtained from the hyper-spectral imaging device;

generating a resulting data cube by adding said residual calibration data cube to a diffuse data cube of a field of view of interest, wherein said diffuse data cube of the field of view of interest is generated from diffused image data of the field of view of interest obtained from said hyper-spectral imaging device; and generating an intrinsic hyper-spectral data cube of the field of view of interest by subtracting said resulting data cube from a focused data cube of the field of view of interest, wherein said focused data cube of the field of view of interest is generated from focused image data of the field of view of interest obtained from said hyper-spectral imaging device.

24. The at least one computer-readable storage medium of claim 23, wherein said reference surface is white.

25. The at least one computer-readable storage medium of claim 23, wherein said field of view of interest comprises a material of interest positioned on said reference surface.

26. The at least one computer-readable storage medium of claim 23, wherein said field of view of interest comprises a view of an outdoor environment.

27. The at least one computer-readable storage medium of claim 23, wherein the residual calibration data cube comprises a single X-axis row of pixels.

28. The at least one computer-readable storage medium of claim 23, wherein the residual calibration data cube has a plurality of X-axis rows of pixels along the Y axis of said reference surface, the number of said plurality of X-axis rows of pixels along a Y axis of said reference surface being less than the total number of X-axis rows of pixels along a Y axis of the entire field of view of interest.

29. The at least one computer-readable storage medium of claim 23, wherein the resulting data cube has a size equal to the size of the focused and diffuse data cubes of the field of view of interest.

\* \* \* \* \*